United States Patent
Swodenk et al.

[15] 3,673,265
[45] June 27, 1972

[54] ISOPRENE RECOVERY

[72] Inventors: Wolfgang Swodenk, Odenthal-Globusch; Wulf Schwerdtel, Cologne; Paul Losacker, Leichlingen; Bruno Engelhard, Cologne, all of Germany

[73] Assignee: Farbenfabriken Bayer Aktiengesellschaft, Leverkusen, Germany

[22] Filed: July 23, 1970

[21] Appl. No.: 57,596

[30] Foreign Application Priority Data

Aug. 6, 1969 Germany..................P 19 39 896.0

[52] U.S. Cl. ............................................260/681, 203/96
[51] Int. Cl. ..................................................C07r 7/08
[58] Field of Search .................................260/681; 208/48

[56] References Cited

UNITED STATES PATENTS 3,494,975  2/1970  Kronig et al. .........................260/681
3,501,550  3/1970  Brandt et al. .........................260/681

Primary Examiner—Delbert E. Gantz
Assistant Examiner—Veronica O'Keefe
Attorney—Burgess, Dinklage & Sprung

[57] ABSTRACT

A crude hydrocarbon mixture containing isoprene and isobutene in addition to formaldehyde monomer and polymers, such as is obtained by cracking 4,4-dimethyl-1,3-dioxane, is subjected to distillation in a column which is supplied near its head with liquid water, fouling of the column thereby being reduced and the distillate being obtained in higher purity.

6 Claims, 1 Drawing Figure

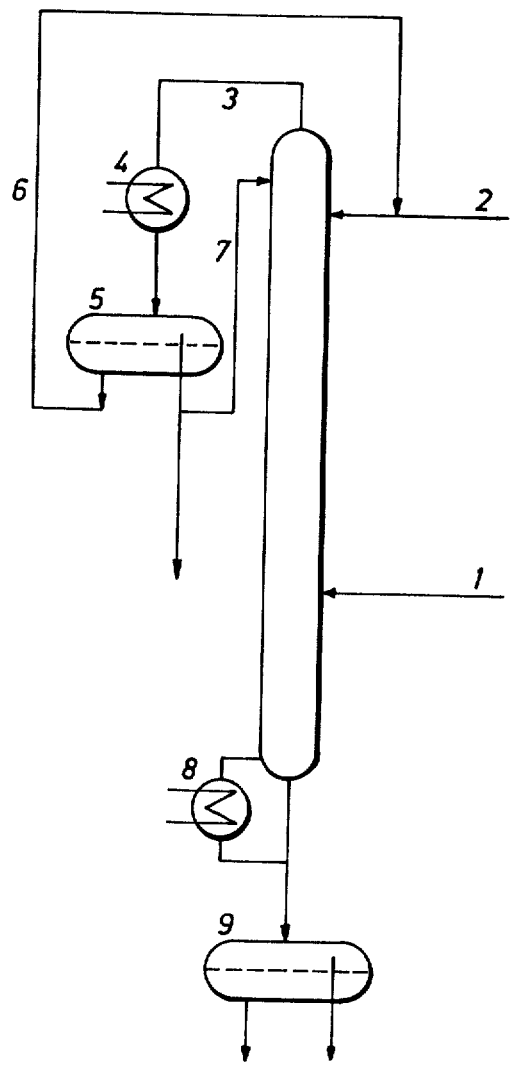
WOLFGANG SWODENK, WULF SCHWERDTEL, PAUL LOSACKER, BRUNO ENGELHARD.

ISOPRENE RECOVERY

This invention relates to a process for the isolation of pure isoprene and isobutene from a crude hydrocarbon mixture of the kind formed in the cracking of 4,4-dimethyl-1,3-dioxane into isoprene and formaldehyde.

It is known from German Pat. No. 610,371, U.S. Pat. No. 2,337,059 and the article by F. Coussemant and M. Hellin in Erdol und Kohle, Erdgas, Petrochemie 15, 274–282 (1962), that 4,4-dimethyl-1,3-dioxane obtained from isobutene and formaldehyde can be cracked into isoprene, formaldehyde and water. The cracking is carried out in the presence of steam as a diluent, in the presence of catalysts containing phosphoric acid, and optionally in the presence of tertiary butanol and condensation products of 4,4-dimethyl-1,3-dioxane and formaldehyde, the composition of such condensation products not being fully known. Isobutene is also formed through secondary reactions and by dehydration of tertiary butanol. In addition, small quantities of hitherto unidentified products of boiling points higher than isoprene are formed as additional secondary products in this reaction.

It has proved to be of particular advantage to carry out the cracking in a fluidized bed at temperatures of from 200° to 300° C. After cracking, most of the formaldehyde formed is washed out of the reaction products with water in different types of quenching and condensing systems. The hydrocarbons are condensed with particular advantage by water in a multi-stage quenching system. In the first quencher, the temperature is reduced so that it is mainly unreacted dioxane and other relatively high boiling products which condense but not isoprene and isobutene. In a second quencher, the temperature is lowered to just above 0° C., as a result of which substantially all the isoprene and most of the isobutene is condensed. The exhaust gas from the second quencher consists mainly of isobutene which can now be liquefied by compression. The organic phase from the second quencher and the hydrocarbon mixture liquefied by compression are combined and delivered for distillation in a column, while the organic condensate from the first quencher is directly combined with the residue from the distillation column.

In order to recover the isobutene and isoprene, all the impurities have to be removed from the hydrocarbon beforehand by an initial distillation because otherwise they would partly decompose in the further distillations to give formaldehyde and other cracking products.

In practice, however, pure isoprene and a mixture of pure isoprene and pure isobutene cannot be separated by normal distillation from the relatively high boiling polymeric secondary products and formaldehyde. In such a distillation, the column becomes completely blocked in a matter of days and the hydrocarbon mixture distilling off overhead contains formaldehyde. Neither can it be separated from this formaldehyde at a later stage because the formaldehyde is entrained through the following columns partly in polymeric form so that it repeatedly contaminates the pure hydrocarbons through reformation of formaldehyde monomer.

It has now been found that blockages in the distillation column can be avoided and at the same time the hydrocarbons can be completely separated from relatively high boiling products and from formaldehyde polymers providing the distillation of isoprene, or a mixture of isoprene and isobutene, is carried out in a special manner, i.e. liquid water is delivered to the head of the column and/or into the rectifying section of the distillation column. The crude mixture of isoprene and isobutene may be such as is obtained by cracking of 4,4-dimethyl-1,3-dioxane which mixture, in addition to hydrocarbons, contains relatively high boiling compounds and monomeric and polymeric formaldehyde.

The water is added in a quantity of from about 5 to 100 parts by weight and preferably in a quantity of from about 5 to 30 parts by weight of the starting product. A small proportion of the water distills off overhead azeotropically with the hydrocarbons and, after cooling, can be separated from the hydrocarbons and recycled, at least in part, to the head of the column. Most of the water passes with the high-boiling constituents into the sump of the column and, optionally after intermediate cooling, can be separated from the organic high-boiling constituents in a separator. The aqueous phase can then be recycled at least in part to the cracking of 4,4-dimethyl-1,3-dioxane. The polymers are separated from the organic phase in another distillation and the head product of such other distillation recycled to the cracking process.

The process according to the invention is illustrated by way of example in the following description with reference to the drawing which is a schematic flow sheet of the process.

The organic product issuing from the quenching system of the dioxane cracking process is introduced into the distillation column D through the pipe 1. Basically, the design of the column is independent of the process. The conventional forms of columns, for example packed columns, sieve-plate columns or bubble tray columns, can be used. Because of the decomposition of the partially unstable products, the column is preferably operated at normal pressure or at a slight excess pressure up to about 3 atmospheres gauge, although higher or even lower pressures are also operable. The head temperature is in the range of about 10° to 60° C. depending both upon the composition of the starting product and upon the pressure used, while the sump or distillation pot temperature is in the range from about 70° to 150° C.

Water is delivered to the head of the distillation column through the pipe 2, preferably just below the reflux or product recycle inlet 7. The head product is removed in the vapor state through the pipe 3, cooled and condensed in a condenser 4 and then transferred to the phase separator 5. The liquid water is separated in this phase separator and is returned at least in part to the column through the pipe 6 connecting with water delivery pipe 2. The upper phase of the separator 5 consists of a mixture of already extremely pure isobutene and isoprene. Some of this mixture may optionally be returned to the column through a pipe 7. Further processing can be carried out by conventional methods. The sump of the column 8 may be in the form of a circulation evaporator, an ordinary distillation retort as known in the art. The sump product or distillation residue is run off into the separator 9, optionally after moderate cooling, in which it is separated into an aqueous phase and an organic phase. The lower aqueous phase contains small quantities of formaldehyde and may with advantage be returned to the isoprene-producing stage, for example into the quenching system of the dioxane cracking process. The upper organic phase consists of unreacted 4,4-dimethyl-1,3-dioxane, unreacted tertiary butanol, 4-methyl-5,6-dihydro-α-pyran, formaldehyde, partly in the form of its polymers, a number of hitherto unknown products and high-boiling polymers. This product is separated in a following distillation (not shown) into polymers as the sump product and into a head product, optionally after it has been combined with the organic phase from the first quencher following the cracker. The head product is advantageously returned to the cracking of 4,4-dimethyl-1,3-dioxane into isoprene.

The process according to the invention is illustrated by the following examples, wherein all parts are by weight unless otherwise expressed.

EXAMPLE 1

The initial distillation stage according to the invention is carried out in a packed column filled with $V_4A$ sieve rings. The column has a diameter of 70 mm and a length of 3,000 mm. The two receivers for the head product and the sump product are in the form of separation vessels. The column is charged with approximately 5.8 kg per hour of the cracking products from crude 4,4-dimethyl-1,3-dioxane (of the kind described for example in British patent application 30817/69). The composition is as follows:

49.2 percent of $C_5$ hydrocarbons (isoprene content 99 percent);

22.1 percent of $C_4$ hydrocarbons (isobutene content 99.5 percent); and 28.7 percent of relatively high boiling product (unreacted 4,4-dimethyl-1,3-dioxane, trioxane, 4-methyl-5,6-dihydro-α-pyran, tert.butanol, methanol and unidentified products).

Approximately 6,500 ppm of free aldehydes (expressed as formaldehyde) can be analytically detected in this mixture.

The inlet nozzles are situated at the following heights above the sump:

| Feed inlet | 900 mm |
|---|---|
| Water inlet | 2660 mm |
| Recycle inlet | 2800 mm |

0.8 kg per hour of new water are introduced to the head of the column through pipe 2, in addition to a normal head product recirculation of 1.9 kg/hour through pipe 7.

4.3 kg per hour of a product with the following composition are withdrawn from separator 5, the column operating at a pressure of 0.5 atmospheres gauge, a head temperature of 36° C. and a sump temperature of 108°–109° C:

30.6 percent of $C_4$ hydrocarbons (isobutene content in excess of 99.5 percent);
68.2 percent of $C_5$ hydrocarbons (iosprene content in excess of 99 percent);
0.2 percent of methanol;
1.0 percent of tert. butanol; and
less than 1 ppm of formaldehyde.

Approximately 85 g of liquid water are separated hourly in the separator 5, and recycled to the column through pipe 6. 2.3 kg per hour of a two-phase mixture are run off as the sump product, being separated in a second vessel 9 into approximately 1.5 kg of an upper organic phase containing less than 0.5 percent of $C_4$ and $C_5$ hydrocarbons, and 0.8 kg of lower aqueous phase containing in solution approximately 5 percent of organic products, above all formaldehyde and unreacted 4,4-dimethyl-1,3-dioxane.

The organic phase from the separator is combined with the liquid organic phase from the first quencher following the cracker, separated in a second distillation from polymeric components and recycled to the cracking process. The aqueous component of the sump product is introduced into the quenching system after the cracking stage. There are no signs of polymerization reactions in the column even after a working time of 800 hours.

EXAMPLE 2

By way of comparison, the difficulties encountered when the column is not operated in accordance with the invention are described in the following:

The same packed column was charged with the same quantities as in Example 1, except that 4 kg/hour of the hydrocarbons run off overhead were used as the reflux component. No water was added. As in Example 1, the pressure was 0.5 atmospheres gauge and the head temperature 36° C. However, the sump temperature amounted to between about 128° and 130° C. After an operation time of only a few hours polymers were constantly being deposited in the vapor pipe, in the head and on the column packing, resulting in complete blockage of the column after less than 100 hours.

EXAMPLE 3

The influence of water upon the polymerization phenomena was investigated in the same packed column as in Example 1 and under the same working conditions as in that example, except for the sump temperatures. The results were as follows:

TABLE

| Quantity of water added | Polymerization phenomena after 200 hours | | sump temperature |
|---|---|---|---|
| | in the vapor pipe | on the column packing | |
| 0.3 kg/h | limited polymer formation | considerable polymer formation | 115–120°C. |
| 0.5 kg/h | no polymer formation | limited polymer formation | 110–112°C. |
| 0.7 kg/h | no polymer formation | no polymer formation | 108–109°C. |
| 1.5 kg/h | no polymer formation | no polymer formation | 106–107°C. |

EXAMPLE 4

The initial distillation stage according to the invention was carried out in a continuous cycle experimental column 30 mm in diameter, filled with glass rings. The rectifying section was 800 mm long and the distillation section 1,000 mm long.

The column was charged with 1,070 g per hour of the cracking products from a crude 4,4-dimethyl-1,3-dioxane whose composition by weight was as follows:

60.2% of isoprene and isobutene;
1.7% of water; and
38.1% of relatively high boiling products.

The analytically detectable aldehyde content (expressed as formaldehyde) amounted to 6,000 ppm.

160 g per hour of water were delivered to the head of the column, run without a hydrocarbon reflux. 650 g per hour of a distillation product with the following composition were obtained at the head of the column at 760 mm Hg., at a head temperature of 29° C. and a sump temperature of 96° C.:

98.46% of isobutene and isoprene;
0.23% of methanol;
0.72% of tert. butanol;
0.52% of relatively high boiling products;
0.08% of water; and
less than 1 ppm of formaldehyde.

Five grams of liquid water per hour were separated from the distillate separator. 575 g per hour of a two-phase mixture were run off as the sump product, being separated in a separation vessel into 410 g of organic products containing less than 0.05 percent of $C_4$ and $C_5$ hydrocarbons (isobutene and isoprene) and 165 g of an aqueous phase containing approximately 5 percent of organic products. There were no signs of any polymerization reactions in the column.

It will be appreciated that the instant specification and examples are set forth by way of illustration and not limitation, and that various modifications and changes may be made without departing from the spirit and scope of the present invention.

What is claimed is:

1. In the separation of isoprene, optionally in admixture with isobutene, from a mixture also containing compounds having higher boiling points than isoprene as well as monomeric and polymeric formaldehyde wherein the mixture is subjected to distillation in a column to distill off the isoprene and isobutene, the improvement which comprises supplying liquid consisting essentially of water to said column adjacent its head, whereby fouling of the column is reduced and the distillate is obtained in higher purity.

2. A process according to claim 1, wherein the liquid is delivered to the column in an amount ranging from about 5 to 100 parts per 100 parts by weight of the mixture subjected to distillation.

3. A process according to claim 1, wherein the distillate is condensed and collected in a separator whereby an aqueous phase and an organic phase separate out, and the aqueous phase is recycled at least in part to said column.

4. A process according to claim 1, wherein the mixture subjected to distillation is obtained by the cracking of 4,4-dimethyl-1,3-dioxane.

5. A process according to claim 4, wherein the distillation residue is withdrawn and allowed to separate into an aqueous phase and an organic phase, and the aqueous phase is recycled at least in part to the cracking of the 4,4-dimethyl-1,3-dioxane.

6. A process according to claim 5, wherein the water is delivered to the column in an amount ranging from about 5 to 30 parts per 100 parts by weight of the mixture subjected to distillation, the distillate is condensed and collected in a separator whereby an aqueous phase and an organic phase separate out, and the aqueous phase is recycled at least in part to said column.

* * * * *